United States Patent
Galligan (10) Patent No.: US 8,473,630 B1
(45) Date of Patent: Jun. 25, 2013

(54) ADAPTIVE VIDEO STREAMING USING TIME-TO-OFFSET MAPPING

(75) Inventor: Francis Galligan, Clifton Park, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/484,112

(22) Filed: May 30, 2012

Related U.S. Application Data (60) Provisional application No. 61/588,138, filed on Jan. 18, 2012.

(51) Int. Cl.
*G06F 15/16* (2006.01)

(52) U.S. Cl.
USPC .......................................... 709/231; 709/224

(58) Field of Classification Search
USPC ................................................ 709/224, 231
See application file for complete search history.

(56) References Cited

U.S. PATENT DOCUMENTS

| | | | | |
|---|---|---|---|---|
| 2010/0146013 | A1* | 6/2010 | Mather | 707/803 |
| 2011/0296048 | A1* | 12/2011 | Knox et al. | 709/231 |
| 2012/0179833 | A1* | 7/2012 | Kenrick et al. | 709/231 |

OTHER PUBLICATIONS

Romero, "A Dynamic Adaptive HTTP Streaming Video Service for Google Android," Oct. 6, 2011, 148 pages.
"Improving the Internet TV and Mobile Video Experience: An Adaptive Streaming Overview," White paper, 2010, 5 pages, Digital Rapids Corporation.
Watson, "Adaptive HTTP streaming and HTML5," W3C Web and TV Workshop, Feb. 8-9, 2011, 6 pages.

* cited by examiner

*Primary Examiner* — Phuoc Nguyen
(74) *Attorney, Agent, or Firm* — Turocy & Watson, LLP (57) ABSTRACT

Systems and methods are provided herein relating to adaptive video streaming. A time-to-offset mapping, also known as a seek index, associated with a set of video blocks can be used to more accurately estimate bandwidth for sections of a video. A video block among the set of video blocks can be dynamically selected as a function of client capabilities. Client capabilities can be dynamically monitored and a stream can be dynamically selected based on the dynamic monitoring. The benefits in using time-to-offset mapping to better estimate bandwidth can better maximize client performance and reliability when playing a video stream.

16 Claims, 11 Drawing Sheets

| Index | Time (Seconds) | Offset (bytes) |
|---|---|---|
| 0 | 0 | 0 |
| 1 | 5 | 125,000 |
| 2 | 10 | 937,500 |
| 3 | 15 | 2,250,000 |
| 4 | 20 | 4,062,500 |
| 5 | 25 | 5,000,000 |
| 6 | 30 | 5,500,000 |
| 7 | 35 | 5,750,000 |
| 8 | 40 | 5,937,500 |
| 9 | 45 | 6,125,000 |

FIG. 3A

| Index | Time (Seconds) | Offset (bytes) | Bandwidth (Kbps) |
|---|---|---|---|
| 0 | 0 | 0 | 200 |
| 1 | 5 | 125,000 | 1300 |
| 2 | 10 | 937,500 | 2100 |
| 3 | 15 | 2,250,000 | 2900 |
| 4 | 20 | 4,062,500 | 1500 |
| 5 | 25 | 5,000,000 | 800 |
| 6 | 30 | 5,500,000 | 400 |
| 7 | 35 | 5,750,000 | 300 |
| 8 | 40 | 5,937,500 | 300 |
| 9 | 45 | 6,125,000 | 200 |

ADAPTIVE VIDEO STREAMING USING TIME-TO-OFFSET MAPPING

CROSS-REFERENCE TO RELATED APPLICATIONS

This application claims the benefit of U.S. Provisional Application No. 61/588,138, filed Jan. 18, 2012, and entitled "ADAPTIVE VIDEO STREAMING USING TIME-TO-OFFSET MAPPING", the entirety of which is incorporated herein by reference.

TECHNICAL FIELD

This application relates to adaptive video streaming, and more particularly to using time-to-offset mapping to estimate bandwidth requirements.

BACKGROUND

Videos hosted on the internet can be viewed on many commercially available electronic devices such as smart phones, tablets, e-readers, computers, personal digital assistants, personal media players, etc. One way to view a video is to download the entirety of a video file and once complete, view the video file using video playing software installed on the electronic device. For long videos or high definition videos, downloading an entire video file can be time consuming and significantly delay a user from beginning to watch the video. One way to begin viewing the video without having to first download the entire video is through video streaming. In video streaming, portions of the video file can be provided piecemeal allowing the end user to begin playback of the video prior to having downloaded the entire video.

One method of video streaming is adaptive streaming. Adaptive streaming is a technique that can detect a user's connection speed to the internet, an available bandwidth, or CPU capacity and use those measurements to select the highest quality video stream that the user is capable of playing. One way to provide adaptive streaming is to host multiple video files of the same video that are capable of streaming, where the files are encoded using different bit rates, different frame rates, different resolutions, etc. A server or client device can then select the appropriate video file to stream based on the client. In addition, throughout playback of the video, if a user's connection speed for example changes, adaptive streaming provides for changing the stream the user is viewing to provide seamless playback under changing conditions. Thus, it can be important to know the bandwidth required for successful playback of each of the multiple video files prior to initially selecting a stream or during playback when switching streams under changing conditions.

Media files usually compress video frames to different sizes based on characteristics of source media and encoding parameters. Video frame sizes (in bits) can vary greatly from one frame to the next or from one set of frames to the next. Typically a media file is described by a bandwidth requirement averaged over the entire file. This average can be very different than a bandwidth requirement associated with one particular frame or a contiguous set of frames, which can potentially lead to intermittently poor streaming quality.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to adaptive streaming. A requesting component can make a request to receive a video, wherein the video is associated with a plurality of video files, wherein the plurality of video files are encoded based on common raw data using different encoding criteria, and wherein each video file of the plurality of video files is associated with a seek index. A bandwidth component can determine an estimated bandwidth requirement for each of the video files based on the corresponding seek index. A streaming component can dynamically select a first video file of the plurality of files to stream as a function of the determined estimated bandwidth requirement and current client capabilities.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Adaptive streaming in general provides for encoding the same video content in at least two different versions where the different versions of the video are encoded at different bit rates. In addition to bit rate, different versions of the video can be at different aspect ratios, different resolutions, etc. In addition to different versions of the video, different versions of audio are capable of being streamed that include, for example, varying languages and varying sampling rates. The server that hosts the video or the client, e.g., an electronic device capable of video playback, can monitor the connection speed, CPU usage, memory usage, etc. of the client in order to select a version of the video that both maximizes video quality and offers reliable playback.

One adaptive streaming delivery method uses the Hyper Text Transfer Protocol ("HTTP") to send video from a server to a client for playback. Other protocols that can be used are SPDY, WebSockets, or file transfer protocol ("FTP"). It can be appreciated that different protocols can be used to perform different aspects of the disclosed system and methods. Using one of these protocols, video and audio sources can be cut into manageable segments. The manageable segments can be the same length or alternatively can be differing lengths that are associated with a common shared timeline. The segments may be determined using Group of Pictures (GOP) boundaries where each GOP begins with a key frame so as to have no dependencies on past or future GOPs. A client can request manageable segments sequentially and use HTTP, for example, to download the segments both prior to and during streaming.

Figure 1:
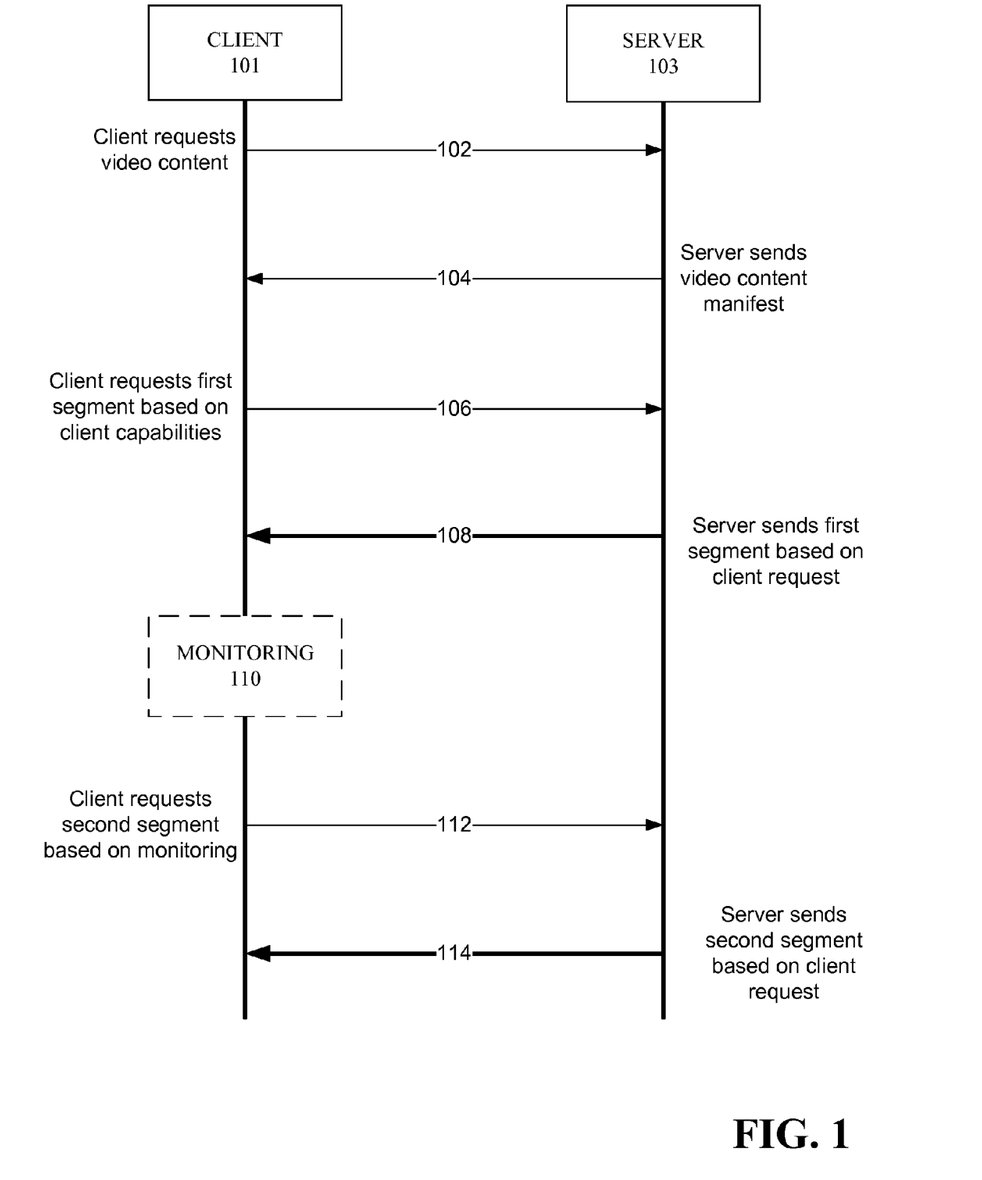
FIG. 1 illustrates an example flow diagram of adaptive streaming in accordance with implementations of this disclosure.

Referring to FIG. 1, there is illustrated an example flow diagram of adaptive streaming in accordance with implementations of this disclosure. Client 101 can be any electronic device capable of playing a video such as a smart phone, tablet, e-reader, computer, personal digital assistant, personal media player, etc. Client 101 can communicate with server 103 using, for example, HTTP, SPDY, WebSockets, or FTP. At 102, client 101 can request video content from server 103. For example, a user of client 101 can select a video they desire to view.

At 104, Server 103 can then send a video content manifest to client 101. The video content manifest can include information associated with the video that client 101 requested to view at 102. The video content manifest can include a list of different versions of video and audio feeds of the video client 101 requested to view. For example, the video content manifest can include a location to five differing video files and two differing audio files related to the same video where each of the five video files can have different bit rates, resolutions, and/or aspect ratios, etc. The audio files can contain different sample rates, different languages, and/or different sound formats, etc. The video content manifest can also include an average total bandwidth for each media file. Each video file identified within the video content manifest can be broken up into manageable segments as discussed above.

At 106, client 101 can request a first segment of the video based on client capabilities. For example, client capabilities such as client connection speed, CPU usage, memory usage, power consumption, etc. can be detected by the client and used to select a video file among a set of video files that maximizes both reliability and quality. At 108, server 103 can send the first segment of the video based on the client request.

During playback of the video stream, at 110, client capabilities can be monitored. At 112, a second segment of the video can be requested by client 101 based on the monitoring. For example, if client capabilities change such that the client can no longer process segments of the video with enough speed to offer continuous playback, a lower bit rate stream can be selected to assure that video playback is not interrupted. Alternatively, if client capabilities change such that the client has more bandwidth available to process a video stream, a higher bit rate or higher quality stream can be selected to offer the client the highest quality stream they are capable of viewing. It can be appreciated that client 101 can dynamically select a different stream in the middle of a segment and is not required to switch streams in between segments as depicted in FIG. 1. At 114, the server can send the second segment of the video based on the client request at 112.

Figure 2:
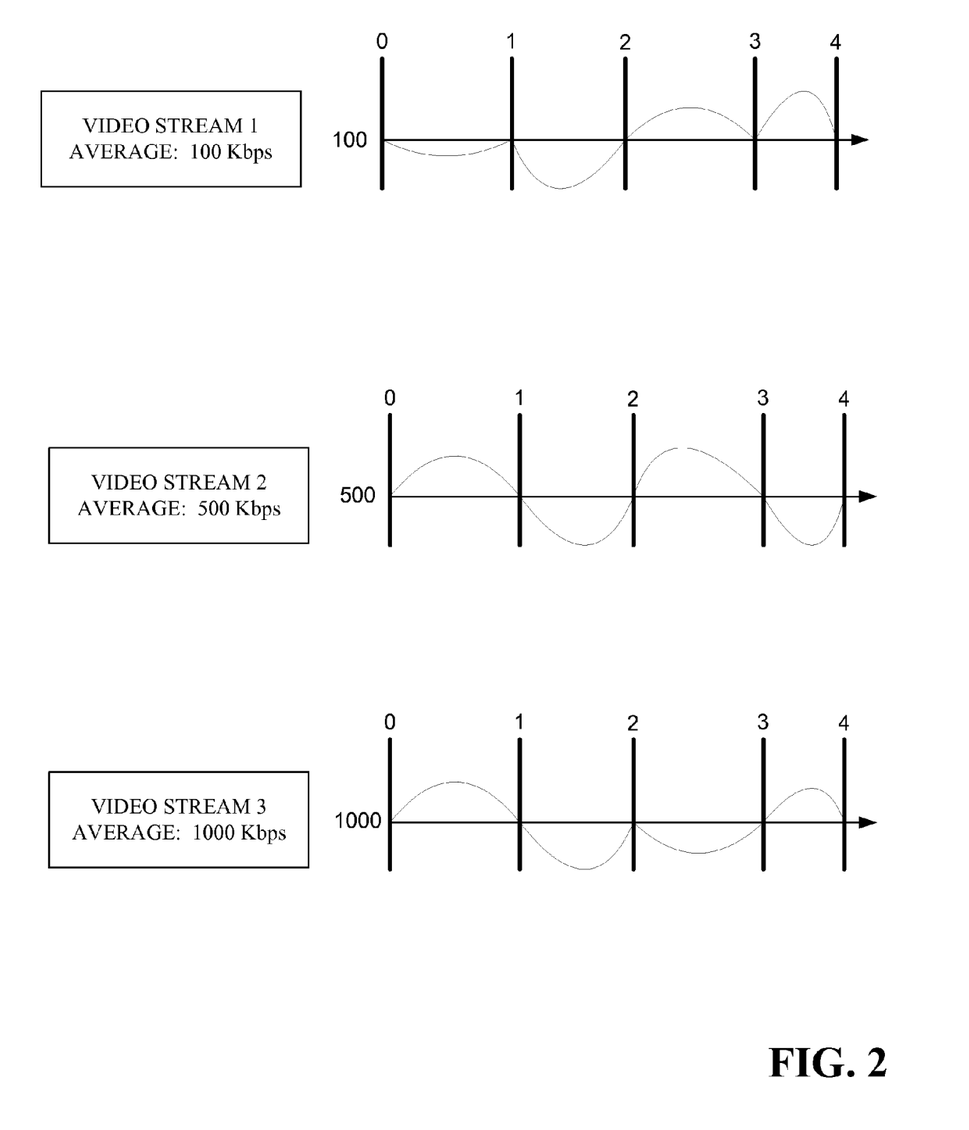
FIG. 2 illustrates examples of bandwidth fluctuation for video files associated with a single video in accordance with implementations of this disclosure.

Referring now to FIG. 2, there are illustrated examples of bandwidth fluctuation for video files associated with a single video in accordance with implementations of this disclosure. Media files usually compress video frames to different sizes based on characteristics of source media and encoding parameters. Video frame sizes (in bits) can vary greatly from one frame to the next or from one set of frames to the next. A media file can be described by a bandwidth requirement averaged over the entire file. This average can be very different than a bandwidth requirement associated with one particular frame or a contiguous set of frames.

An example of varying bandwidth fluctuations for associated video files, streams or feeds (herein referred to as video streams for simplicity) is depicted in FIG. 2. It can be appreciated that these are examples only and that an actual video can have more or less than three video files, streams, or feeds associated with the actual video. In addition, audio files, streams, or feeds not depicted can also be associated with the actual video. In this example, each of the three associated video streams is on a common timeline and contains the same underlying content, encoded with differing video characteristics.

Bit rate is a measure of the rate of information content in a video stream. The first example, Video Stream 1, is associated with an average bit rate of 100 Kbps. The second example, Video Stream 2, is associated with an average bit rate of 500 Kbps. The third example, Video Stream 3, is associated with an average bit rate of 1000 Kbps. Each graph depicts bit rate on the vertical axis and time on the horizontal axis. Each graph further divides each associated video stream into four separate sections. As seen in the first graph, even though the average bit rate for Video Stream 1 is 100 Kbps, the actual bit rate over time is not static and each section of the video stream has its own average bit rate. For example, in the section with boundaries of 0 and 1, the actual (and average) bit rate is lower than the average file bit rate of 100 Kbps. However, in the section with boundaries of 2 and 3, the actual bit rate is higher than the average file bit rate of 100 Kbps. Similar to Video Stream 1, graphs related to the actual bit rates of Video Stream 2 and Video Stream 3 are also depicted.

If a client determines that the capabilities of the device on which a user wishes to watch a video is limited to a bandwidth of 550 Kbps (e.g., due to a current network connection speed, CPU usage, memory usage, etc.), an adaptive streaming system may initially select Video Stream 2, a stream with an average bit rate of 500 Kbps, as the appropriate stream for the client. However, as depicted in the graph associated with Video Stream 2, the first section with boundaries of 0 and 1 has an actual bit rate higher than the average bit rate of 500 Kbps. Therefore, during the first section of the video, a client with a bandwidth limited to 550 Kbps may only be able to play Video Stream 1 reliably (e.g., smoothly without intermittent pauses). Thus, an adaptive streaming system that selects a video stream to stream based on average bit rate may encounter problems playing a video stream that has bandwidth fluctuations, such as those depicted in regards to Video Stream 2 in FIG. 2. Similarly, during the section of the video with boundaries of 2 and 3, the same client with a limited bandwidth of 550 Kbps may have enough bandwidth to play Video Stream 3, a potentially higher quality video, during the section even though the average bandwidth of Video Stream 3 is 1000 Kbps. In this regard, if the client knows the actual bandwidth for each section of a video stream rather than an average bandwidth over all the sections of the video stream, it can more intelligently select and switch to an appropriate stream to maximize reliability and quality.

Figure 3A:
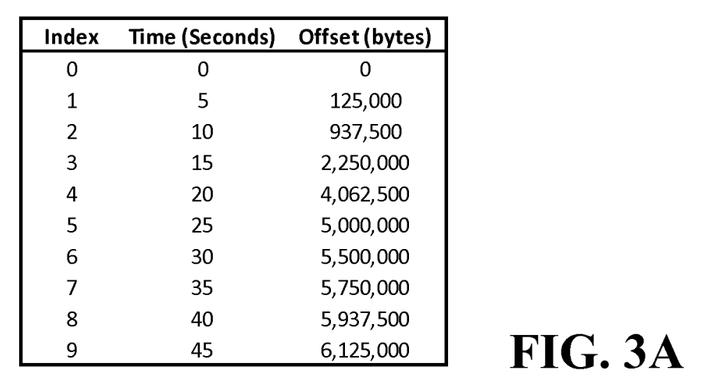
FIG. 3A illustrates a chart comprising example time-to-offset mapping data in accordance with implementations of this disclosure.

Referring now to FIG. 3A, there illustrated is a chart comprising example time-to-offset mapping data in accordance with implementations of this disclosure. A time-to-offset mapping, also known as a seek index, can be included in the video manifest initially received by client 101 at step 104 in FIG. 1 or can be part of the media file itself. The seek index contains a list of times in a media file with a corresponding byte offset. For the example shown in FIG. 3A, the media file is 50 seconds long, the size of the file is 6,250,000 bytes, and there are 10 seek points. Accordingly, the seek index is divided into 10 sections denoted by the "Index" column. A corresponding time and byte offset are also provided for each section. To determine an estimated bit rate for a section N of the video, the client can look at element N+1 in the mapping to get an end time and an end byte offset. The bandwidth for section N can then be identified as ((end offset-start offset) *8/1000)/(end time-start time). To determine the bandwidth of the last element, the client may use the file size as the end offset and the duration of the file as the end time. It can be appreciated that file size and duration can be included as portions of a video content manifest.

Figure 3B:
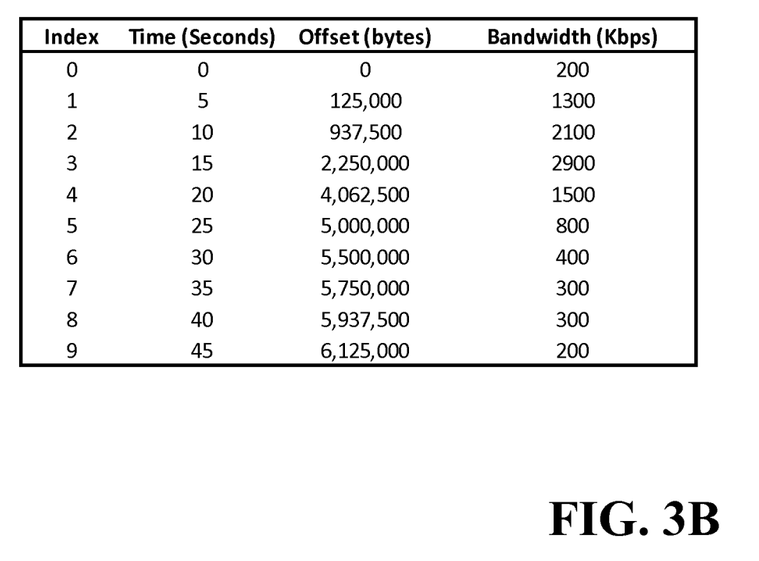
FIG. 3B illustrates a chart comprising example bandwidth estimations for sections of the video file associated with FIG. 3A in accordance with implementations of this disclosure.

Referring now to FIG. 3B, there is illustrated a chart comprising example bandwidth estimations for sections of the video file associated with FIG. 3A in accordance with implementations of this disclosure. Using the seek index of FIG. 3A and the formula described above, an estimated bandwidth is calculated for each section of the video file. The estimated bandwidths are shown in a fourth column, "Bandwidth (Kbps)". Averaging all ten sections of the video, the average bandwidth required for all ten sections is 1000 Kbps; however, the second through fifth sections of the video each have estimated bandwidths higher than the average bandwidth of 1000 Kbps. In this regard, a client that has a maximum bandwidth capability of 1050 Kbps would meet the average bandwidth threshold for this video; however, the client may struggle in playing the second through fifth sections, without interruptions, due to the increased bandwidth requirements for these respective sections.

Systems and methods herein provide for the client to use time-to-offset data to generate a better estimate of bandwidth between different sections of video files.

Figure 4:
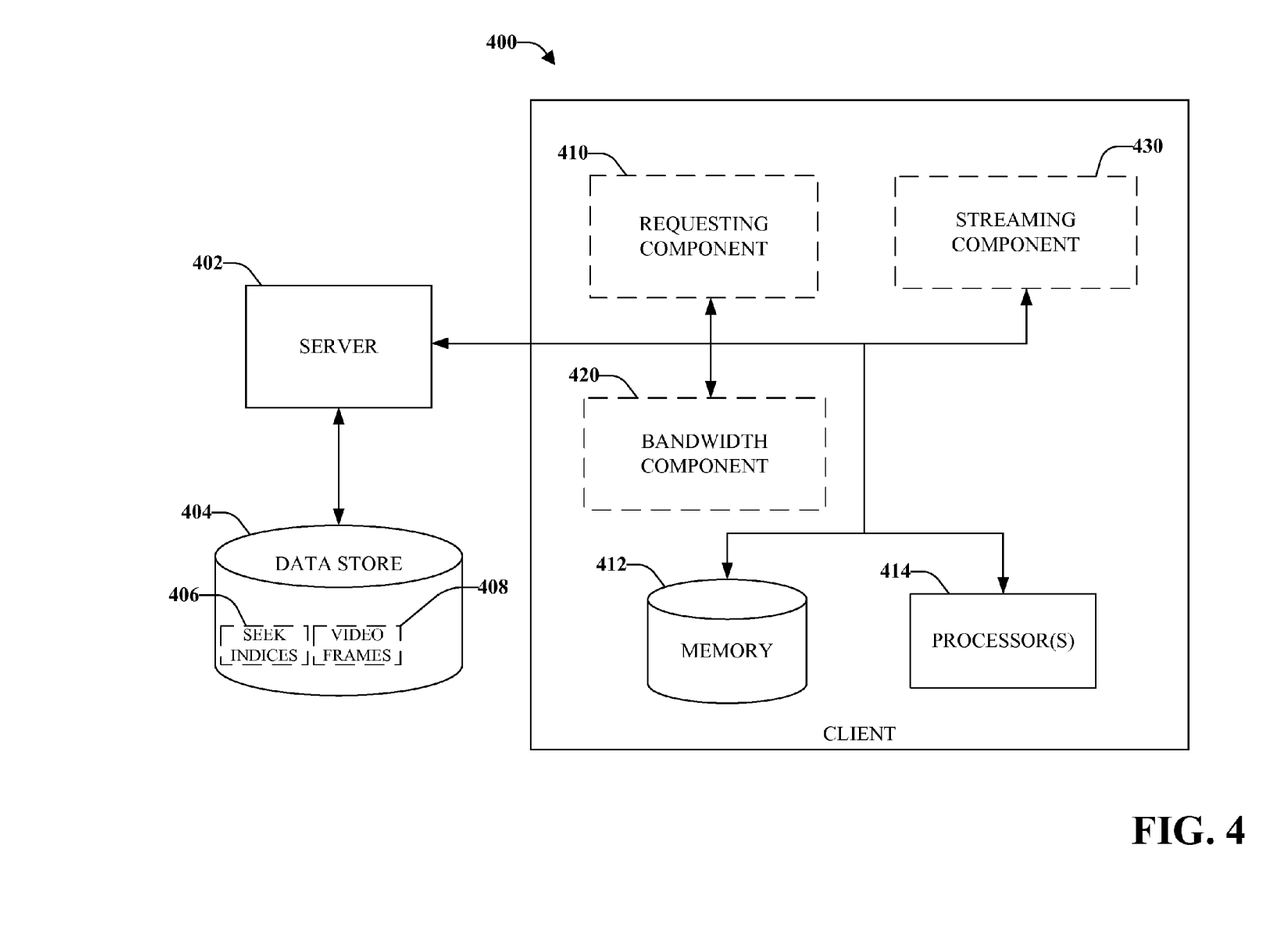
FIG. 4 illustrates a high-level functional block diagram of an example system using bandwidth estimations in accordance with implementations of this disclosure.

Referring to FIG. 4, there is illustrated a high-level functional block diagram of an example system using bandwidth estimations in accordance with implementations of this disclosure. In FIG. 4, a client 400 includes a requesting component 410, a bandwidth component 420, a streaming component 430, a memory 412, and a processor 414, each of which may be coupled as illustrated. Client 400, and its components, can be in communication with server 402 and data store 404, using, for example, HTTP, SPDY, WebSockets, FTP, etc.

A requesting component 410 can make a request to view a video. For example, a user of client 400 can use an input device associated with the client to select a video the user desires to view. The video the user desires to view can have multiple file or stream options associated with the video. For example, at least two video files for the same video can be available to stream. The video files have differing video characteristics, e.g., differing bit rates, resolutions, aspect ratios, width, height, and/or sample rate, etc. The differing video files can be broken into sections. For example, if three separate video files are associated with the video, each of the three separate video files can be broken into sections.

In one implementation, the sections can be of identical length such that the first section of each of the separate video files are the same length, the second section of each of the separate video files are the same length, etc. In another implementation, the sections can have varying lengths that all relate to a common timeline. For example, if the first section of the first separate video file is 10 seconds, and the first section of the second separate video file is 5 seconds, a timeline can be established to indicate that the second section of the second separate video file shares a common timeline with the first section of the first separate video file.

Each section of a video file can be associated with a set of one or more video frames that make up the section. For example, a video file can include a first set of one or more video frames associated with a first section of the video. In one implementation, each section is a chunk. In one implementation, each chunk is a Group of Pictures (GOP), beginning with a key frame and having no dependencies on past or future GOPs. In one implementation, a section can include more than one chunk.

A bandwidth component 420 can determine an estimated bandwidth requirement for each of the video sections. In one implementation, the bandwidth component can receive a plurality of seek indices 406 associated with a plurality of video frames 408 stored within data store 404 in server 402. Client 400 can receive the seek indices as a part of a video content manifest, as a part of the video file, or from a data store, using for example, HTTP. Bandwidth component 420 can determine the estimated bandwidth requirement for each of the video sections based on the plurality of seek indices. In one implementation, bandwidth component 420 can extract an end offset, a start offset, an end time, and a start time for each of the video sections based on the plurality of seek indices. In one implementation, bandwidth component 420 can determine an estimated bandwidth for a last section of a video file based on a file size and a file duration.

Streaming component 430 can dynamically select one of the video files (e.g., a first video file) to stream based on the estimated bandwidths as a function of client capabilities. Client capabilities can include, for example, client connection speed, CPU usage, memory usage, or client resource monitors. In one implementation, streaming component 430, upon completion of streaming a first video section from the first video file, can dynamically select a second video section from a second video file to stream. The selection can be a function of updated information on client capabilities and bandwidth estimated using a corresponding seek index. The second video file, being associated with the same video as the first file, is based on common raw data as a first video file, but has different video characteristics, e.g., a different bit rate, resolution, aspect ratio, width, height, and/or sample rate, etc. It can be appreciated that streaming component 430 can continue to dynamically select a next video section among an Nth (N is an integer) set of video sections to stream where the video requested by requesting component 410 contains N sections of the video.

Figure 5:
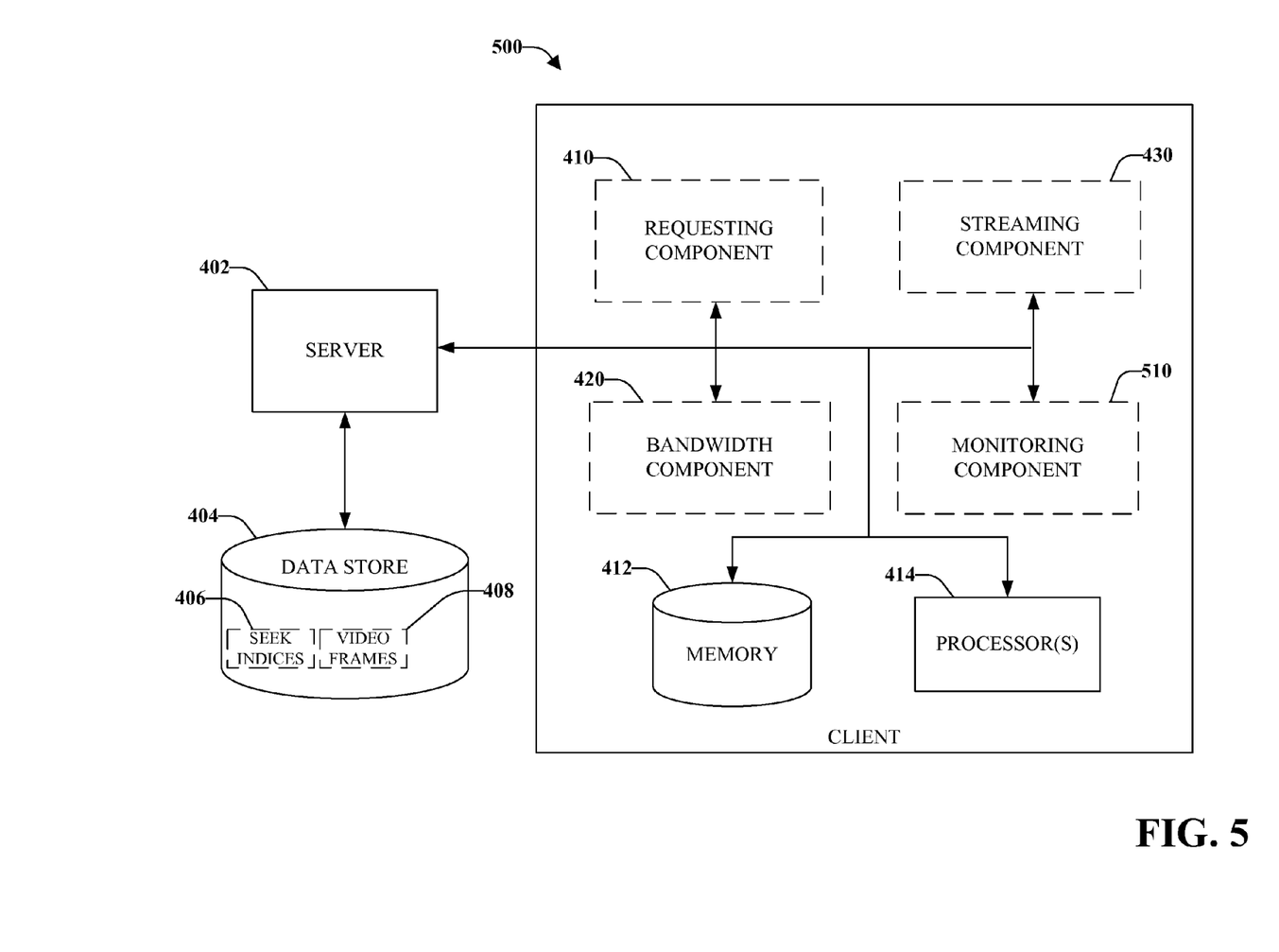
FIG. 5 illustrates a high-level functional block diagram of an example system using bandwidth estimations in adaptive streaming including a monitoring component in accordance with implementations of this disclosure.

Referring now to FIG. 5, there is illustrated a high-level functional block diagram of an example system using bandwidth estimations in adaptive streaming including a monitoring component 510 in accordance with implementations of this disclosure. Monitoring component 510 can dynamically monitor client capabilities such as client connection speed, usage associated with client memory 412, usage associated with client processor(s) 414, and other resource monitors uniquely pertinent to the client. Streaming component 430 can dynamically select to stream one of the video files, beginning at a new key frame, based on the dynamic monitoring. For example, if during the middle of a section, monitoring component 510 detects a drop in client capabilities (e.g., a drop in client connection speed); streaming component 430 can dynamically select a new file (e.g., a lower bit rate video file) to stream mid section, beginning at the next key frame, based on the dynamic monitoring. It can be appreciated that through the use of identical length sections or a common timeline, dynamic switching between different video files can be accomplished seamlessly without interruptions to the user. As an alternate example, if during the middle of a section, monitoring component 510 detects an increase in available processor(s) 414 resources (e.g., a separate previously open application on the client device is closed), streaming component 430 can dynamically select a new file (e.g., a higher quality video file) to stream mid section, beginning at the next key frame.

FIGS. 6-9 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

Figure 6:
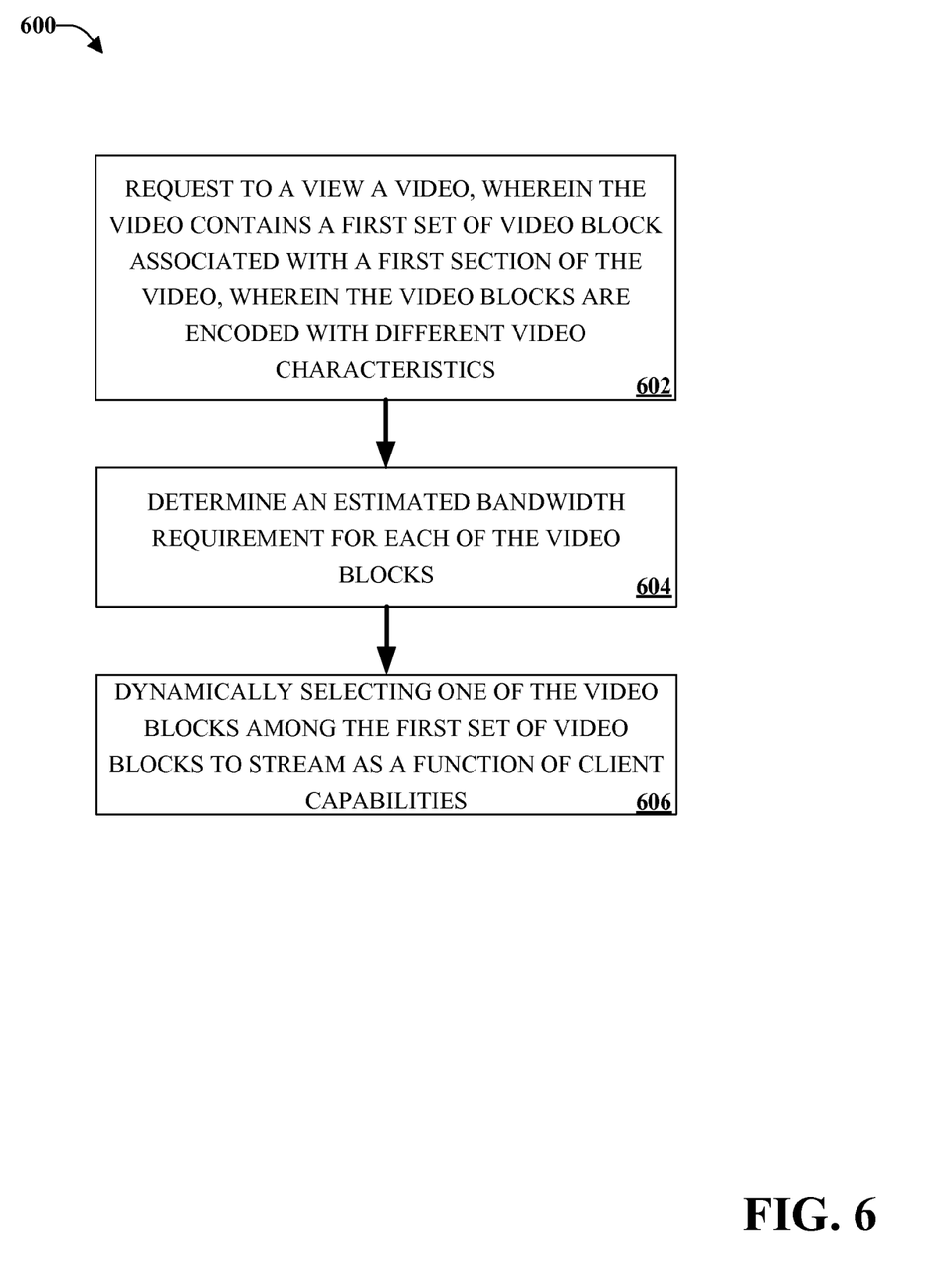
FIG. 6 illustrates an example flow diagram method for using bandwidth estimations in adaptive streaming in accordance with implementations of this disclosure.

FIG. 6 illustrates an example method for using bandwidth estimations in adaptive streaming in accordance with implementations of this disclosure. At 602, a video can be requested (e.g., by a requesting component 410) to view, wherein the video contains a first set of video blocks associated with a first section of the video, wherein the video blocks are encoded with different video characteristics. At 604, an estimated bandwidth can be determined (e.g., by a bandwidth component 420) for each of the video blocks based on seek indices associated with the video blocks. At 606, one of the video blocks among the first set of video blocks can be dynamically selected (e.g., by a streaming component 430) to stream as a function of client capabilities.

Figure 7:
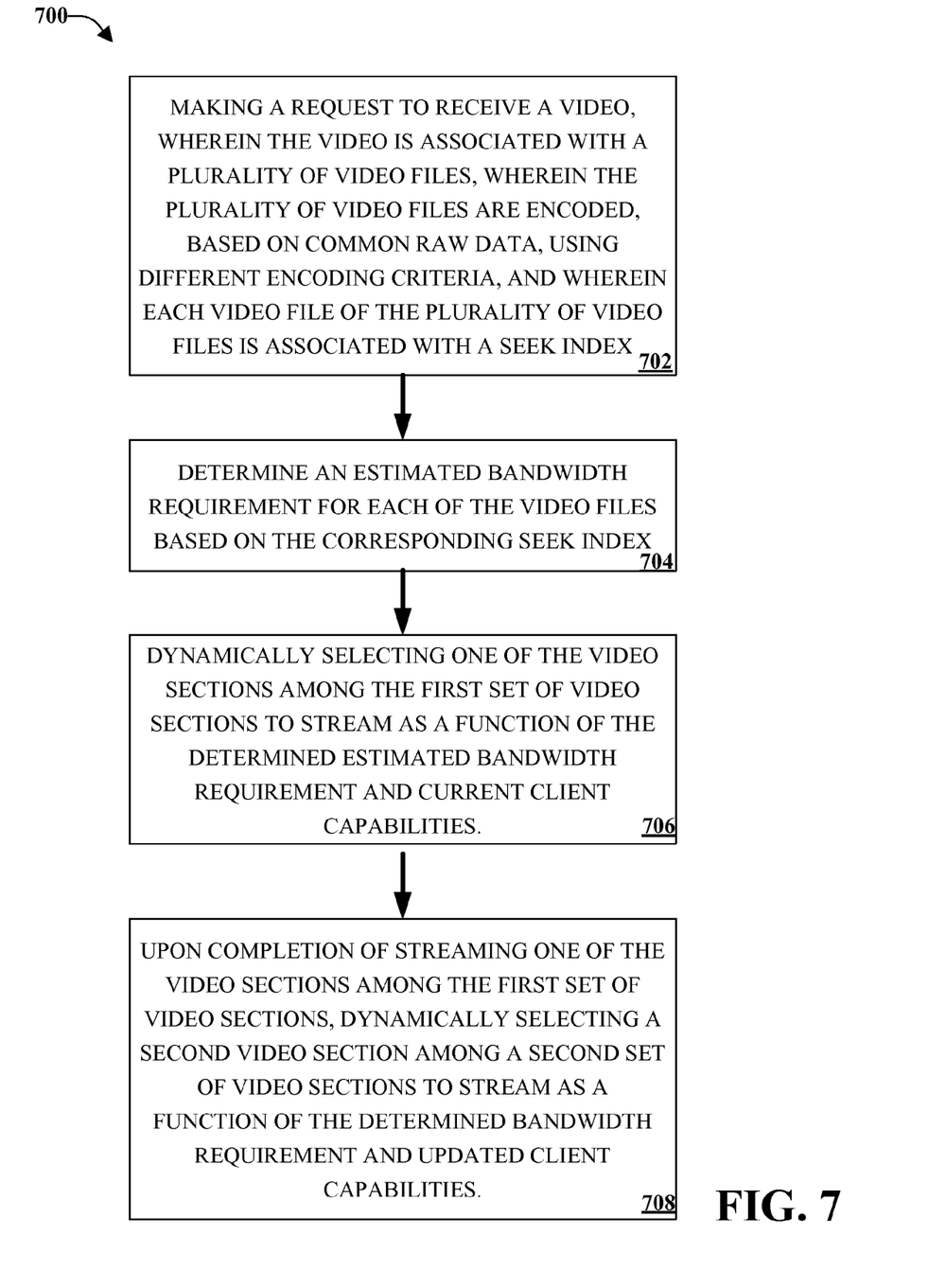
FIG. 7 illustrates an example flow diagram method for using bandwidth estimations in adaptive streaming in accordance with implementations of this disclosure.

FIG. 7 illustrates an example method for using bandwidth estimations in adaptive streaming in accordance with implementations of this disclosure. At 702, a video can be requested (e.g., by a requesting component 410) to view. The video is associated with a plurality of video files. The plurality of video files are encoded, based on common raw data, using different encoding criteria, e.g., different bit rate and/or different resolution, etc. Each video file is associated with a seek index, which provides a division of the video file into sections based on seek points. In one implementation, the seek points are based at least in part on Group of Pictures (GOP) boundaries. At 704, an estimated bandwidth can be determined (e.g., by a bandwidth component 420) for each section of each video file. At 706, one of the video sections among the first set of video sections can be dynamically selected (e.g., by a streaming component 430) to stream as a function of the estimated bandwidth of a section and current client capabilities. Upon completion of streaming one of the video sections among the first set of video sections, at 708, one of the video sections among a second set of video sections can be dynamically selected (e.g., by a streaming component 430) to stream as a function of client capabilities. This latter one of the video sections may be associated with the same video file as the prior one of the video sections, or may be associated with a different video file among the plurality of video files.

Figure 8:
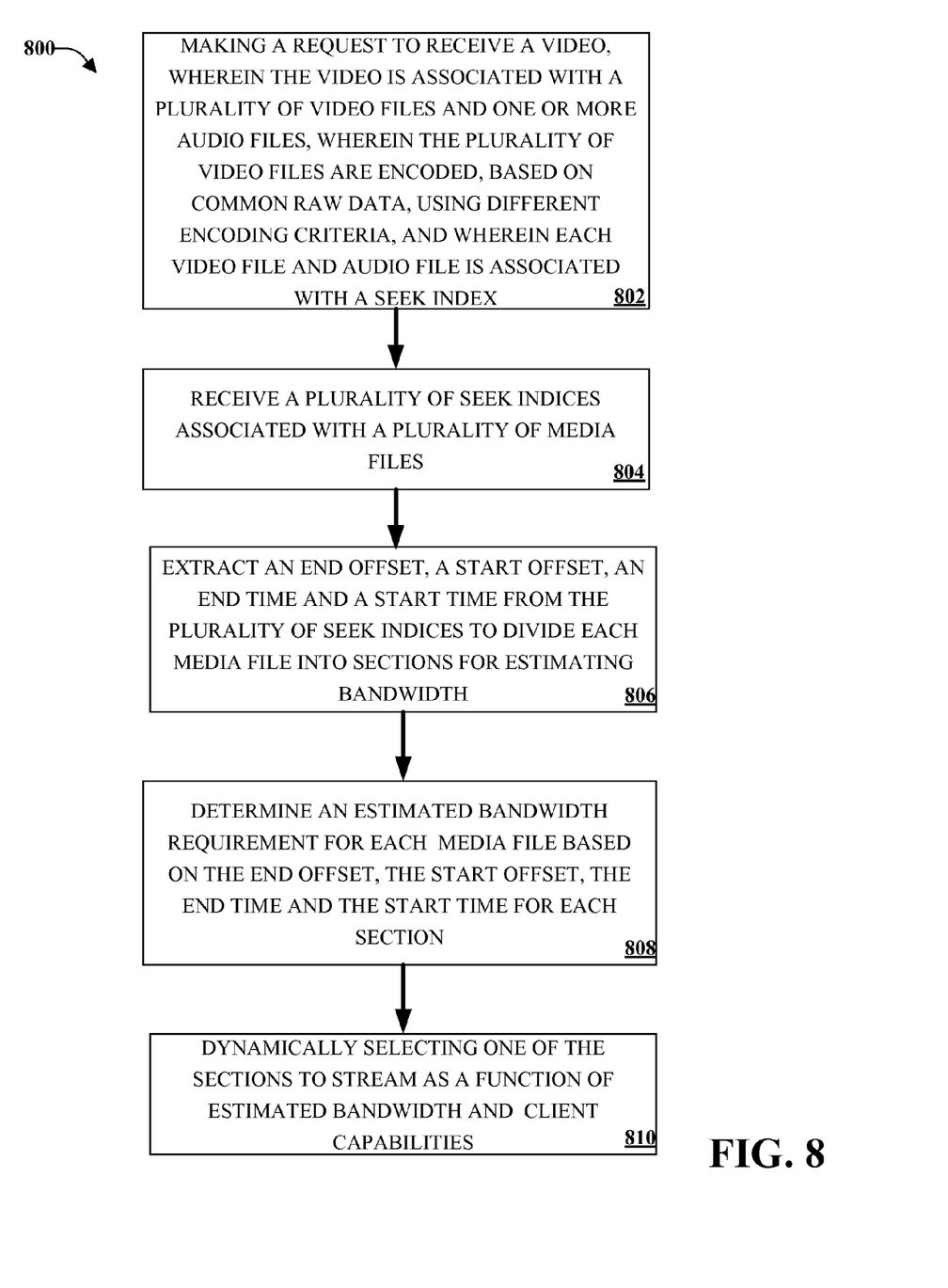
FIG. 8 illustrates an example flow diagram method for using bandwidth estimations in adaptive streaming including using a plurality of seek indices in accordance with implementations of this disclosure.

FIG. 8 illustrates an example method for using bandwidth estimations in adaptive streaming including using a plurality of seek indices in accordance with implementations of this disclosure. At 802, a video can be requested (e.g., by a requesting component 410). The video is associated with a plurality of video files and one or more audio files. The plurality of video files are encoded, based on common raw data, using different encoding criteria, e.g., different bit rate and/or different resolution, etc. Each video file is associated with a seek index. The one or more audio files may be, for example, two audio files, each in a different language. Each audio file may also have a seek index. The seek index associated with a particular audio file may also be shared with a particular video file. At 804, the plurality of seek indices associated with the plurality of media files can be received (e.g., by a bandwidth component 420). At 806, an end offset, a start offset, an end time and a start time can be extracted (e.g., by a bandwidth component 420) from a corresponding seek index to divide each media file into sections for estimating bandwidth. At 808, an estimated bandwidth can be determined (e.g., by a bandwidth component 420) for each media file based on the end offset, the start offset, the end time and the start time for each section. At 810, one of the sections is dynamically selected (e.g., by a streaming component 430) as a function of the estimated bandwidth and client capabilities.

Figure 9:
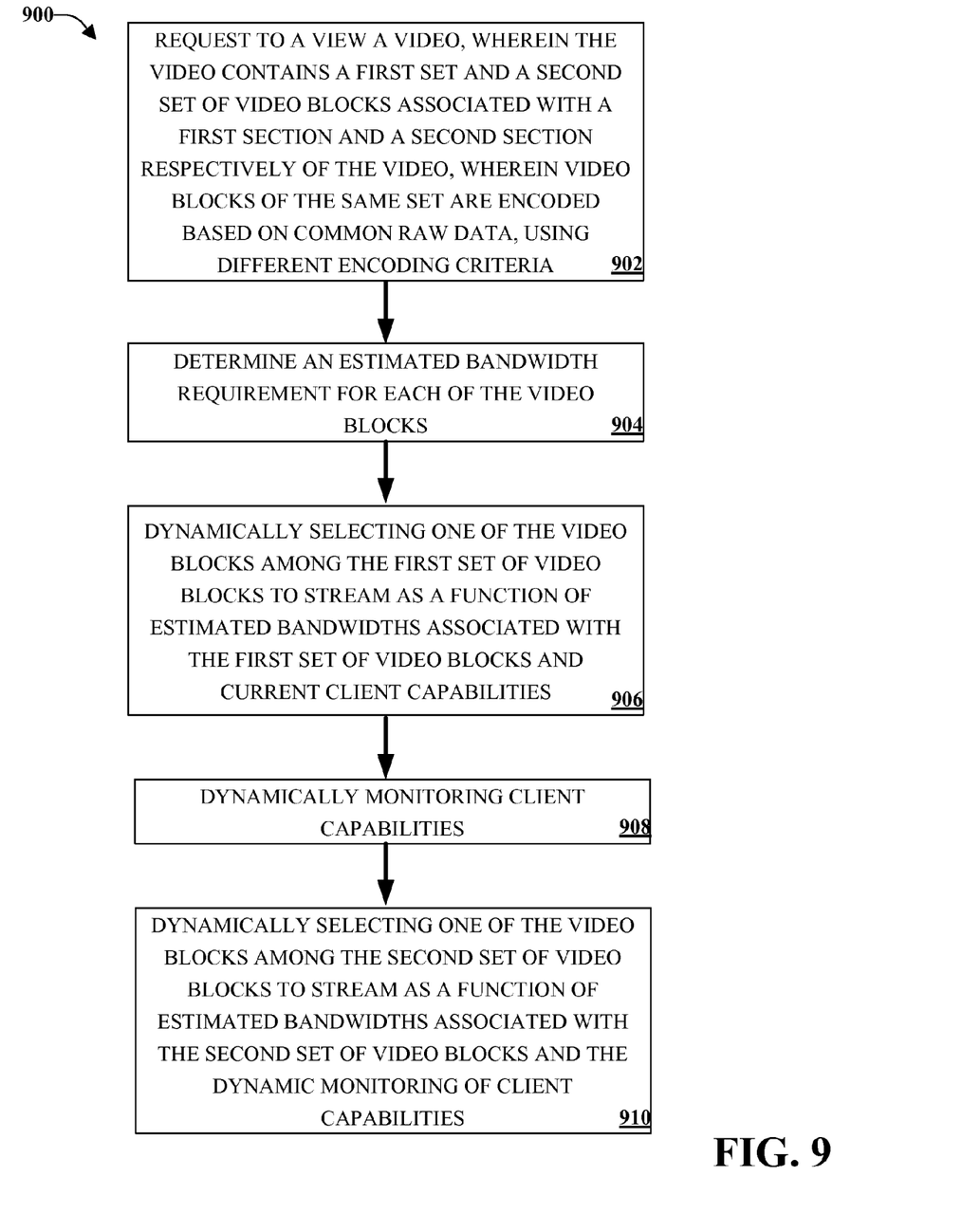
FIG. 9 illustrates an example flow diagram method for using bandwidth estimations in adaptive streaming including dynamically monitoring client capabilities in accordance with implementations of this disclosure.

Referring now to FIG. 9, there is illustrated an example method for using bandwidth estimations in adaptive streaming including dynamically monitoring client capabilities in accordance with implementations of this disclosure. At 902, a video can be requested (e.g., by a requesting component 410) to view. The video can be associated with a first and second set of video blocks associated with a first section and second section respectively of the video. The video blocks of the same set are encoded, based on common raw data, using different encoding criteria, e.g., different bit rate and/or different resolution, etc., such that the video blocks have different video characteristics. At 904, an estimated bandwidth can be determined (e.g., by a bandwidth component 410) for each of the video blocks. At 906, one of the video blocks among the first set of video blocks can be selected (e.g., by a streaming component 420) as a function of estimated bandwidths associated with the first set of video blocks and current client capabilities. At 908, client capabilities can be dynamically monitored (e.g., by a monitoring component 510). At 910, one of the video blocks among the second set of video blocks can be dynamically selected (e.g., by a streaming component 430) as a function of estimated bandwidths associated with the second set of blocks and the dynamic monitoring of client capabilities.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 10:
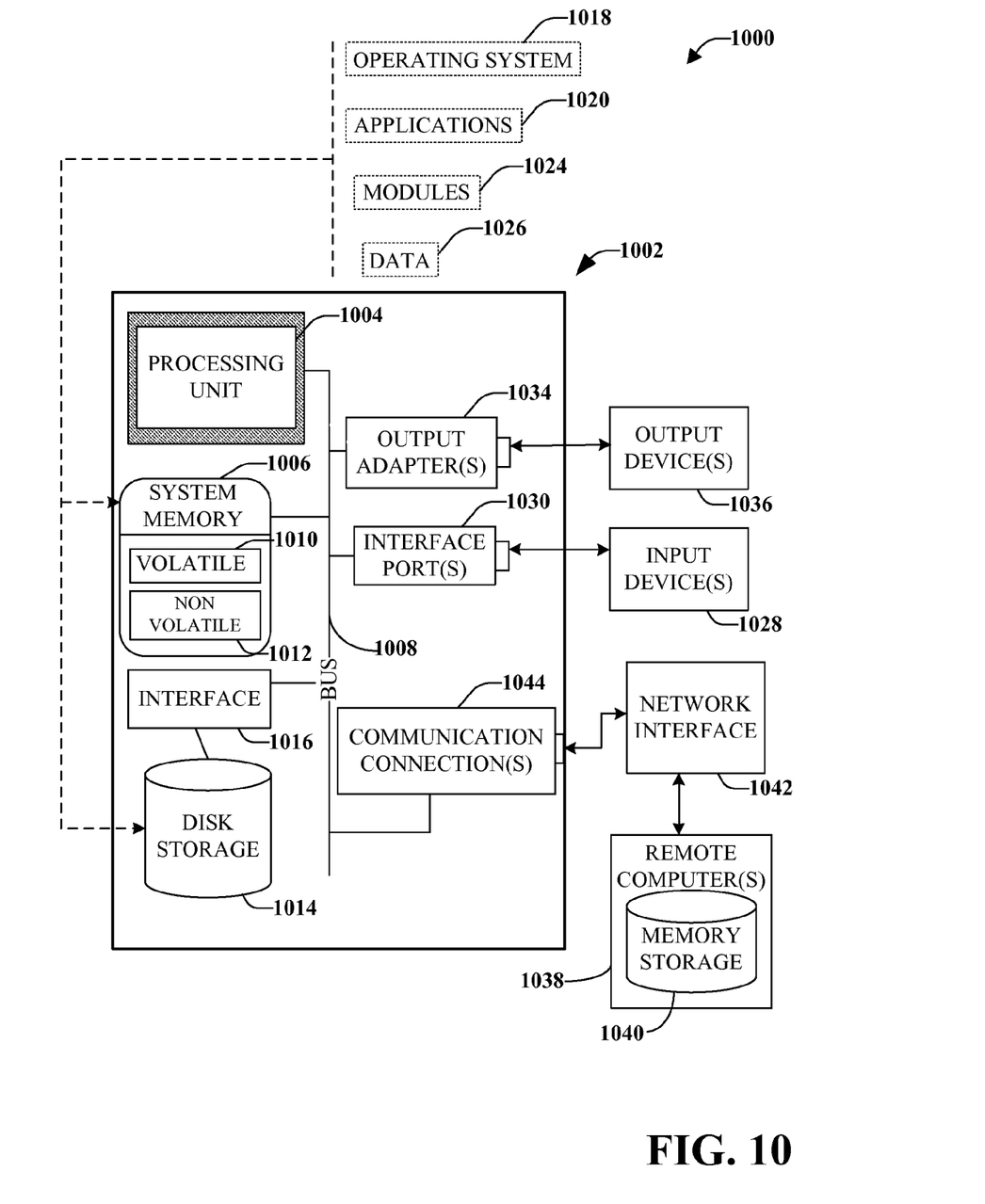
FIG. 10 illustrates an example block diagram of a computer operable to execute the disclosed architecture in accordance with implementations of this disclosure.

With reference to FIG. 10, a suitable environment 1000 for implementing various aspects of the claimed subject matter includes a computer 1002. The computer 1002 includes a processing unit 1004, a system memory 1006, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
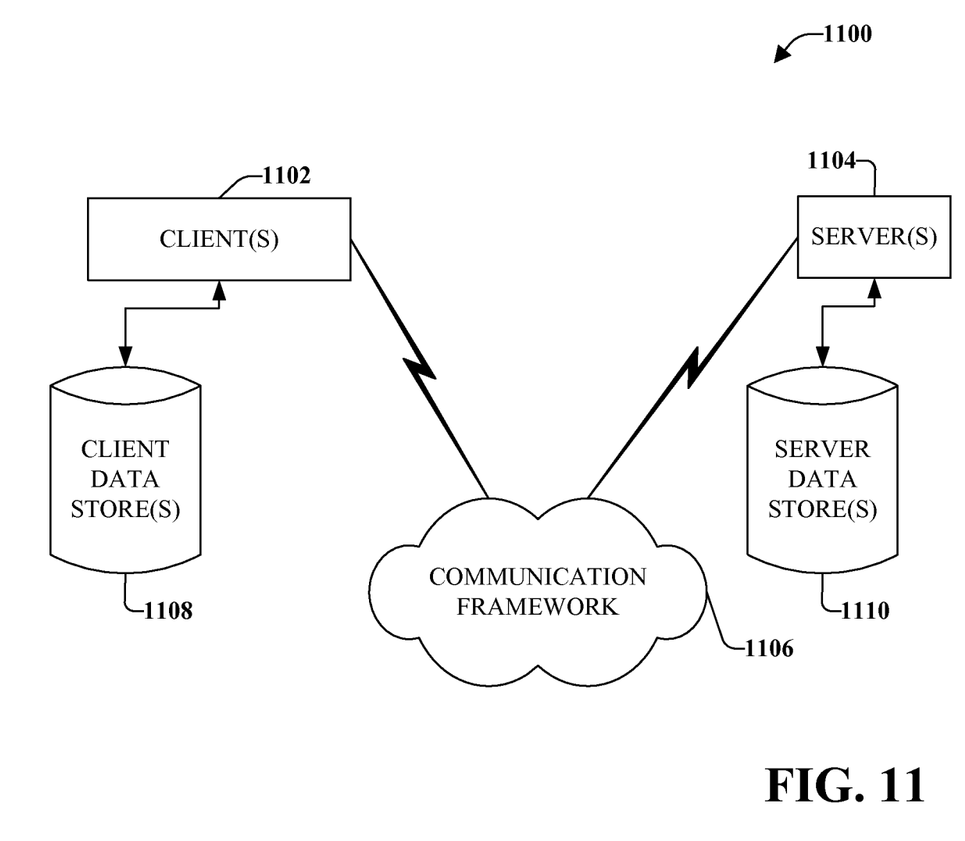
FIG. 11 illustrates an example schematic block diagram for a computing environment in accordance with implementations of this disclosure.

Referring now to FIG. 11, there is illustrated a schematic block diagram of a computing environment 1100 in accordance with the subject specification. The system 1100 includes one or more client(s) 1102, which can include an application or a system that accesses a service on the server 1104. The client(s) 1102 can be hardware and/or software (e.g., threads, processes, computing devices). The client(s) 1102 can house cookie(s), metadata, and/or associated contextual information. The client(s) 1102 can house threads to perform, for example, making a request to receive a video, determining bandwidth requirements, dynamically selecting video files, etc.

The system 1100 also includes one or more server(s) 1104. The server(s) 1104 can also be hardware or hardware in combination with software (e.g., threads, processes, computing devices). The servers 1104 can house threads to perform, for example, sending a video manifest, monitoring client capabilities, etc. in accordance with the subject disclosure. One possible communication between a client 1102 and a server 1104 can be in the form of a data packet adapted to be transmitted between two or more computer processes where the data packet contains, for example, portions of a video stream. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
   a memory that has stored thereon computer executable components; and
   a processor that executes the following computer executable components stored in the memory:
      a requesting component that makes a request to receive a video, wherein the video is associated with a plurality of video files, wherein the plurality of video files are encoded based on common raw data using different encoding criteria, and wherein each video file of the plurality of video files is associated with a seek index;
      a bandwidth component that determines estimated bandwidth requirement for each of the video files based on the corresponding seek index;
      a monitoring component that dynamically monitors client capabilities and provides updated client capability information to the streaming component; and
      a streaming component that dynamically selects a first video file of the plurality of files to stream as a function of the determined estimated bandwidth requirement and current client capabilities wherein the streaming component dynamically selects to stream a second video file in the plurality of video files based on the dynamic monitoring.

2. The system of claim 1, wherein the streaming component, upon completion of streaming a section of the first video file, dynamically selects a second video file of the plurality of video files to stream as a function of the determined estimated bandwidth requirement and updated client capability information.

3. The system of claim 1, wherein the bandwidth component determines an estimated bandwidth requirement for each of section of each video file based on the corresponding seek index.

4. The system of claim 1, wherein the bandwidth component determines an estimated bandwidth requirement for each section of each video file based on an end offset, a start offset, an end time, and a start time determined based on the corresponding seek index.

5. The system of claim 1, wherein the current client capabilities includes a current client connection speed.

6. The system of claim 1, wherein the current client capabilities includes a current client processor usage value.

7. The system of claim 1, wherein the current client capabilities includes a current client memory usage value.

8. The system of claim 1, wherein the different encoding criteria includes a different bit rate.

9. The system of claim 1, wherein the different encoding criteria includes a different resolution.

10. A method comprising:
    using a processor to execute computer executable components stored on a computer readable medium to perform the following acts:
       making a request to receive a video, wherein the video is associated with a plurality of video files, wherein the plurality of video files are encoded, based on common raw data, using different encoding criteria, and wherein each video file of the plurality of video files is associated with a seek index;
       determining an estimated bandwidth requirement for each of the video files based on the corresponding seek index;
       dynamically monitoring client capabilities;
       dynamically selecting a first video file of the plurality of files to stream as a function of the determined estimated bandwidth requirement and current client capabilities; and
       dynamic selecting to stream a section from a second video file in the plurality of video files based on the dynamic monitoring.

11. The method of claim 10, further comprising:
    dynamically selecting a second video file of the plurality of video files to stream upon completion of streaming a section of the first video file, wherein the dynamically selecting is a function of the determined estimated bandwidth requirement and updated client capability information.

12. The method of claim 10, further comprising determining an estimated bandwidth requirement for each section of each video file in the plurality of video files based on the corresponding seek index.

13. The method of claim 10, further comprising determining an estimated bandwidth requirement for a section of a video file in the plurality of video files based on an end offset, a start offset, an end time, and a start time identified in the corresponding seek index.

14. The method of claim 10, wherein the current client capabilities includes at least one of a current client connection speed, a current client processor usage value, and a current client memory usage value.

15. The method of claim 10, wherein the different encoding criteria includes at least one of a different bit rate and a different resolution.

16. A system comprising:
    means for making a request to receive a video, wherein the video is associated with a plurality of video files, wherein the plurality of video files are encoded, based on common raw data, using different encoding criteria, and wherein each video file of the plurality of video files is associated with a seek index;
    means for determining an estimated bandwidth requirement for each of the video files based on the corresponding seek index;
    means for dynamically monitoring client capabilities;
    means for dynamically selecting a first video file of the plurality of files to stream as a function of the determined estimated bandwidth requirement and current client capabilities; and means for dynamic selecting to stream a section from a second video file in the plurality of video files based on the dynamic monitoring.

\* \* \* \* \*